No. 744,693. PATENTED NOV. 17, 1903.
W. SCHARNWEBER.
COMBINED MATCH STICK MAKING AND RACKING MACHINE.
APPLICATION FILED JUNE 6, 1902.
NO MODEL. 2 SHEETS—SHEET 1.
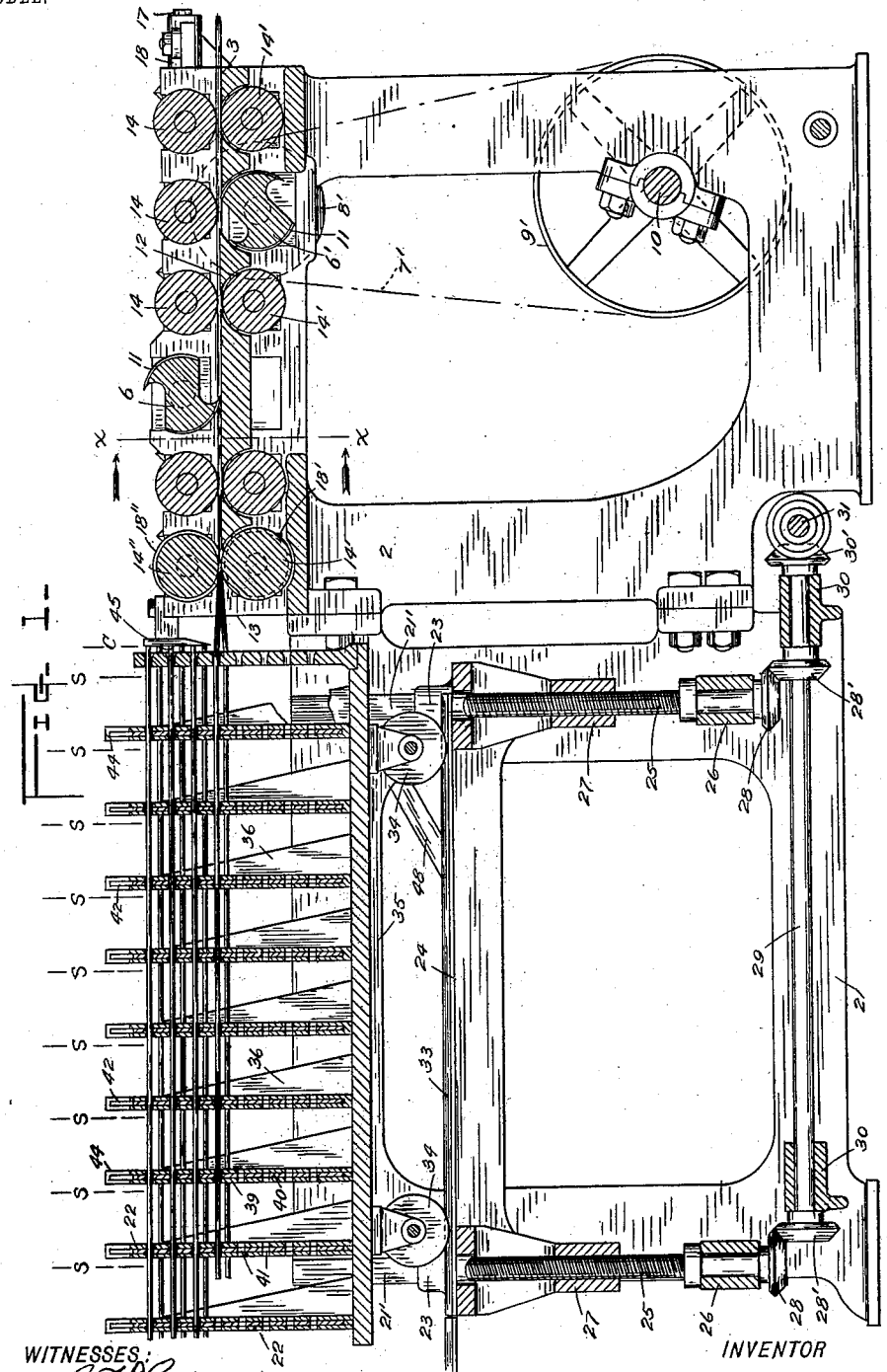
WITNESSES:
INVENTOR
Wm. Scharnweber.
BY
Pierre Barnes,
ATTORNEY No. 744,693. PATENTED NOV. 17, 1903.
W. SCHARNWEBER.
COMBINED MATCH STICK MAKING AND RACKING MACHINE.
APPLICATION FILED JUNE 6, 1902.
NO MODEL. 2 SHEETS—SHEET 2.
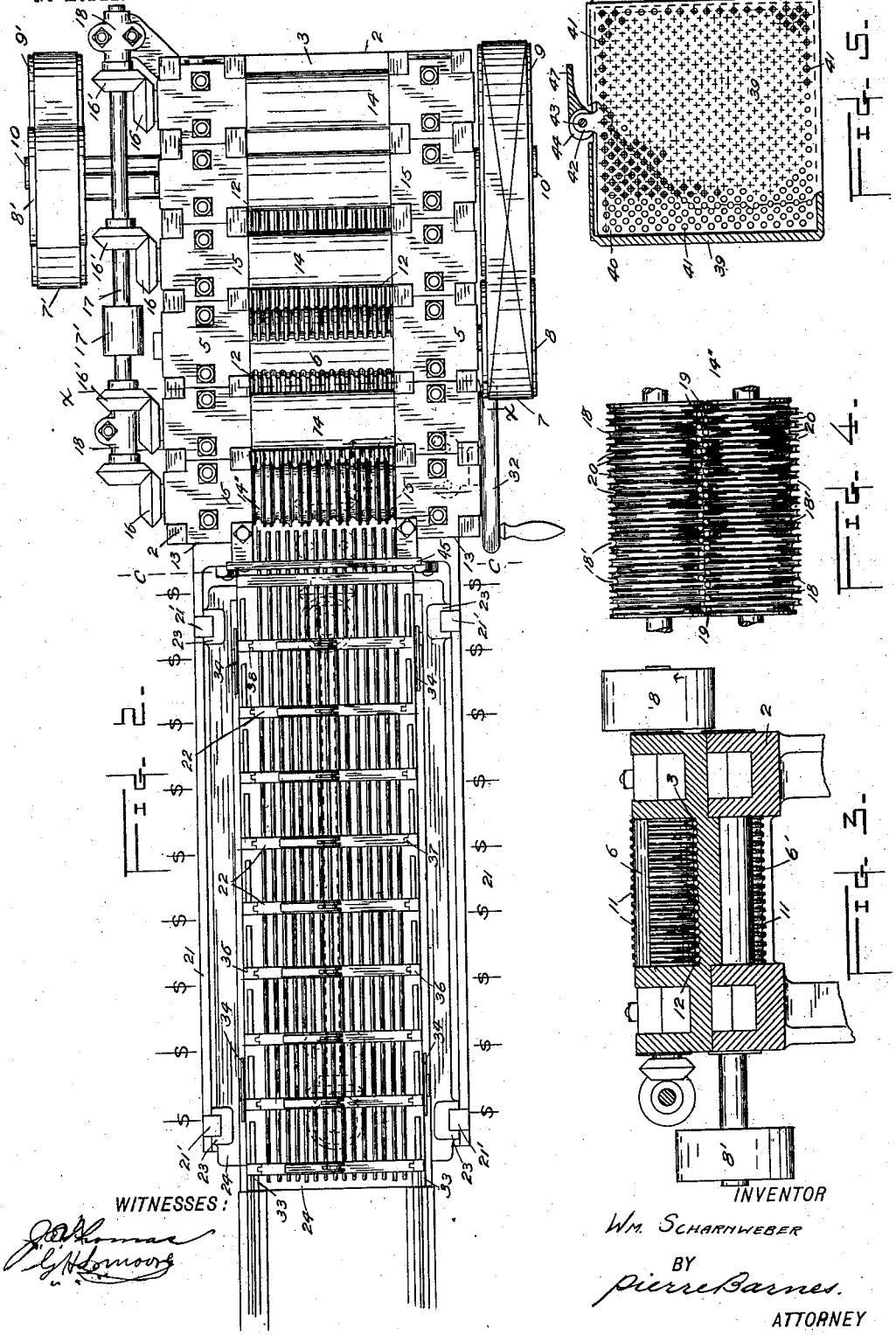
WITNESSES:
INVENTOR
WM. SCHARNWEBER
BY
Pierre Barnes.
ATTORNEY No. 744,693. Patented November 17, 1903.

UNITED STATES PATENT OFFICE.

WILLIAM SCHARNWEBER, OF SEATTLE, WASHINGTON.

COMBINED MATCH-STICK MAKING AND RACKING MACHINE.

SPECIFICATION forming part of Letters Patent No. 744,693, dated November 17, 1903.

Application filed June 6, 1902. Serial No. 110,423. (No model.)

*To all whom it may concern:*

Be it known that I, WILLIAM SCHARN-WEBER, a citizen of the United States, residing at Seattle, in the county of King and State of Washington, have invented a certain new and useful Improvement in a Combined Match-Stick Making and Racking Machine, of which the following is a specification, reference being had therein to the accompanying drawings.

The object of my invention is to provide a machine of simple construction by which match-sticks are cut more rapidly than has been heretofore accomplished by other machines.

A further object of the invention is to lessen the labor of handling the match-sticks by the provision of an improved racking attachment to the framework, whereby the match-sticks are collected in racks ready for dipping simultaneously with their production.

Other objects and advantages accruing from the invention and the construction and combination of the several parts constituting the same will be apparent from the following specification.

In the accompanying drawings, Figure 1 is a central longitudinal vertical section of a machine embodying my invention. Fig. 2 is a plan view of the same. Fig. 3 is a vertical cross-section taken on line $xx$ of Figs. 1 and 2. Fig. 4 is an enlarged front elevation of the deflecting rolls 14" shown in Figs. 1 and 2; and Fig. 5 is a similar view of a rack 22, partly in section and shown somewhat diagrammatic.

In the drawings the reference-numeral 2 designates the main framework, provided with a table or bed 3 and suitably constructed to receive the working parts of the machine. Mounted in bearings 5 of the frame is a top cutter 6 and a bottom cutter 6', driven in opposite directions by belts 7 7', passing around pulleys 8 8' on the cutter-arbors from driving-pulleys 9 9' of counter-shaft 10. The said cutters are each integral, preferably, and are provided with circumferential semicircular grooves 11, those of one cutter being in alinement with those of the other, and also with longitudinal semicircular grooves 12, cut in the upper surface of the table 3. The last-named grooves extend from the lower cutter 6' and beneath the top cutter to the tail end 13 of the table. Feed-rolls 14 14' 14", journaled in suitable bearings 15, are disposed at intervals along the length of the table, and they may be all driven, though I prefer to make the lower row idlers and the upper row live ones, with the exception of the roll immediately above the cutter 6'. The live rolls are driven, preferably, by bevel gear-wheels 16 16', fixedly secured to the several roll-axles and to a driving-shaft 17, journaled in bearings 18. This shaft 17 may be rotated by a belt from an independent counter-shaft passing around pulley 17' or may be connected with the first-mentioned counter-shaft 10 by belt or a system of gear-wheels. The rolls, with the exception of the pair 14" adjacent to the tail end of the table, are preferably covered with an elastic substance, such as rubber. The pair 14" (see Fig. 4) are of metal or other hard material and are formed with a plurality of annular collars 18' and intervening recesses 18" severally in line with the said table-grooves, and the collars of one roll interlap those of the other, so as to provide interstices 19 alternately above and below the plane of the table-groove centers. The said collars and recesses are scored with semicircular grooves 20 to insure their taking a firmer hold on the shaped sticks passing therethrough.

Secured to the main frame is a supplemental frame 21 for the reception of the match-stick racks 22 and the mechanism for controlling and operating their movement, so as to work in conjunction with the stick-shaping device heretofore described. Upright posts 21' of frame part 21 register with channeled offsets 23 of an elevator-platform 24, whereby the latter is guided to move vertically as it is raised or lowered. Screws 25, supported by bearings 26, engage threaded sleeves or nuts 27 of said platform. 28 represents bevel gear-wheels fixedly secured to said screws and mesh with corresponding gears 28' on spindle 29, journaled in bearings 30, and operated by gears 30' from a cross-shaft 31, having a hand-wheel 32 thereon. Tracks 33 are provided upon said elevator-platform for wheels 34 of a carriage 35, which support the racks 22. These racks are retained in a vertical position at equal distances apart by brackets 36, having grooves 37, which interfit with guide-tongues 38, provided on the opposite upright edges of the racks. The racks, which are plainly shown in Fig. 5, severally comprise a narrow box-like casing 39, containing a plate 40, slidable vertically therein. Both the plates 40 and the adjacent walls of its respective case are perforated by a number of holes 41, arranged to be in line one with the other when the plates are seated upon the bottoms of the cases. The said perforations are arranged in horizontal rows, so that two of the rows will contain a number of holes equal to the number of the aforementioned grooves 12 of table 3; but no two adjoining holes will be in a single row—that is to say, they are positioned alternately in the top and bottom rows of each pair. Extending upwardly from each of plates 40 is a lug 42, which is eccentrically connected by a pivotal pin 43 to a cam 44, seated upon the adjacent upper edges of the case, whereby the inner plates can be raised to throw the perforations thereof out of register with the cases to clamp the match-sticks in the racks.

The operation of the invention is as follows: The stock $a$, which is a thin piece of wood, such as "veneering," is fed between and by the rollers 14 14' to the cutters. The lower cutter planes a number of corrugations in the under side of the stock to register with the table-grooves therebeyond, which guide the half-formed sticks beneath the upper cutter, and the latter's reverse planing from the top surface of the stock will separate the same into a plurality of round sticks, these sticks propelled between rolls 14", where they are deflected by the interlapping faces thereof to penetrate the holes of the adjacent rack and thence on through the remainder. When one group or two horizontal rows of rack-holes are filled, the elevator-platform 24 is raised by the hoisting-gear to present a new group of holes to be charged. As the elevator is raised, the ends of the match-sticks are cut off at $c$ by a knife-blade 45, secured to the framework. When the racks are entirely filled with sticks, they are individually clamped by moving the holes of the plates 40 thereof out of line with those of their casings by raising the cam thumb-levers 47. A dog 48 is then lowered to permit the rack-carriage being wheeled from its supporting-platform to be replaced by another having empty racks. It may be stated that the sticks are cut into match lengths at positions indicated by lines $s$ with gang-saws or other suitable device, when they are ready for dipping to complete the matches.

Having thus described my invention, what I claim as new, and desire to secure by Letters Patent, is—

1. A machine of the type set forth comprising in combination with a frame, a table having longitudinal grooves therein, a series of upper and lower cutters having grooves adapted for alinement with those of the table for cutting a veneer into splints, a vertically-movable platform mounted in the frame, means for raising and lowering the same, a carriage mounted thereon, racks secured to the carriage, said racks comprising perforated casings, and vertically-slidable plates secured therein having perforations adapted to register with the perforations of the casings, substantially as described.

2. In combination with the frame of a match-splint-forming machine, grooved cutters for cutting splints from a veneer, means for actuating the same, a vertically-movable platform, a carriage thereon, spaced racks mounted on said carriage, said racks comprising perforated casings, and vertically-slidable plates having perforations therein adapted to register with the openings of the casings, and adapted to receive the splints from the cutters, and means for raising said plates, substantially as described.

3. In combination with the framework of a match-splint-forming machine, rotary cutting means for forming the splints, a vertically-movable platform, means for raising and lowering the same, a carriage mounted thereon, spaced brackets secured to said carriage, racks secured in said brackets, and means for cutting said splints in lengths, substantially as described.

In testimony whereof I affix my signature in presence of two witnesses.

WILLIAM SCHARNWEBER.

Witnesses:
 PIERRE BARNES,
 G. H. L. MOORE.